(12) United States Patent
Frei et al.

(10) Patent No.: US 11,159,897 B2
(45) Date of Patent: Oct. 26, 2021

(54) METHOD FOR CHARGING A BATTERY OF A HEARING AID AND A HEARING AID WITH A BATTERY CHARGING UNIT

(71) Applicant: Sonova AG, Staefa (CH)

(72) Inventors: Christian Frei, Staefa (CH); Hilmar Meier, Herrliberg (CH); Kathrin Vuille-Dit-Bille, Zurich (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 15/775,847

(22) PCT Filed: Nov. 16, 2015

(86) PCT No.: PCT/EP2015/076653
§ 371 (c)(1),
(2) Date: May 14, 2018

(87) PCT Pub. No.: WO2017/084686
PCT Pub. Date: May 26, 2017

(65) Prior Publication Data
US 2018/0332408 A1    Nov. 15, 2018

(51) Int. Cl.
*H04R 25/00* (2006.01)
*H02J 7/00* (2006.01)
(Continued)

(52) U.S. Cl.
CPC .......... *H04R 25/602* (2013.01); *H02J 7/0073* (2013.01); *H02J 7/025* (2013.01);
(Continued)

(58) Field of Classification Search
CPC .............. H04R 25/652; H04R 2225/31; H04R 2225/33; H02J 50/10; H02J 7/0073; H02J 7/025; H02J 2007/005
See application file for complete search history.

(56) References Cited

U.S. PATENT DOCUMENTS

| 4,297,630 A | 10/1981 | Mullersman |
| 8,767,986 B1 * | 7/2014 | Fabry ..................... H04R 25/70 381/314 |

(Continued)

FOREIGN PATENT DOCUMENTS

| WO | WO2003107506 | 12/2003 |
| WO | WO2010081915 | 7/2010 |
| WO | WO-2014044292 | 3/2014 |

OTHER PUBLICATIONS

International Search Report and Written Opinion; International Application No. PCT/EP2015/076653; filed Nov. 16, 2015; dated Jun. 27, 2016; 11 pages.

*Primary Examiner* — Sunita Joshi

(57) ABSTRACT

The present invention pertains to a method for charging a rechargeable battery (5) of a hearing aid (1). The proposed method comprises detecting a power supply (8) being connected to the hearing aid (1), estimating a state of charge of the battery (5), selecting one of at least a normal and a fast charging mode in dependence of the estimated state of charge, and charging the battery (5) according to the selected charging mode. Moreover, the present invention provides a hearing aid (1) including a battery charging unit (9) and adapted to support the proposed method.

20 Claims, 1 Drawing Sheet

(51) Int. Cl.
*H02J 7/02* (2016.01)
*H02J 50/10* (2016.01)

(52) U.S. Cl.
CPC ......... *H02J 50/10* (2016.02); *H02J 2007/005* (2013.01); *H04R 2225/31* (2013.01); *H04R 2225/33* (2013.01)

(56) References Cited

U.S. PATENT DOCUMENTS

2006/0164035 A1* 7/2006 Van Beek ............. H02J 7/0073
320/107
2007/0104343 A1 10/2007 Bengtsson

* cited by examiner

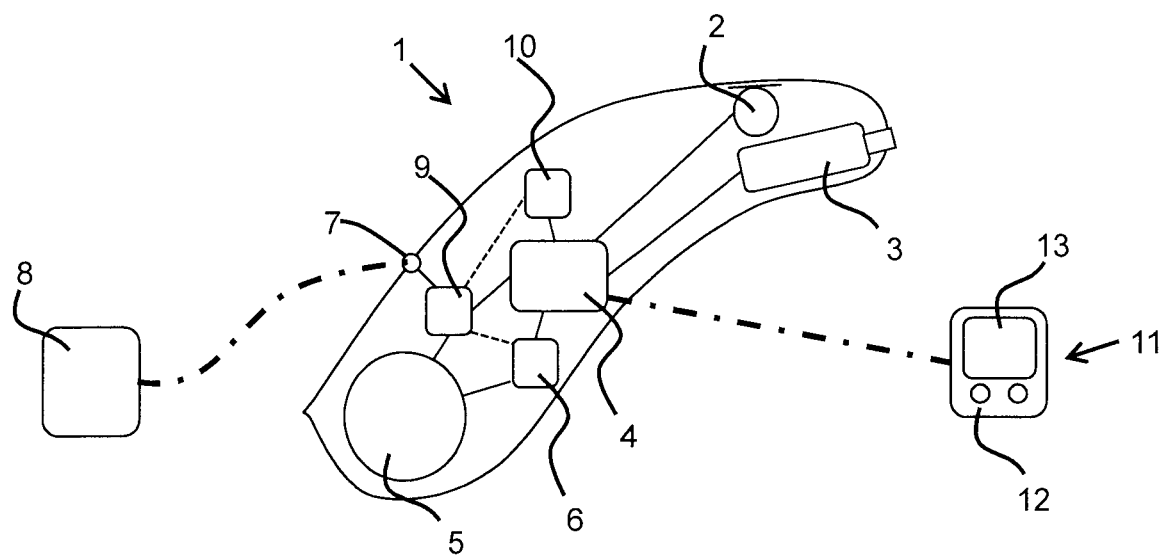

METHOD FOR CHARGING A BATTERY OF A HEARING AID AND A HEARING AID WITH A BATTERY CHARGING UNIT

TECHNICAL FIELD

The present invention relates to charging a rechargeable battery of a hearing aid, in particular to a method for charging a lithium ion battery. The present invention further pertains to a hearing aid with a battery charging unit, in particular a hearing aid powered by a lithium ion battery.

BACKGROUND OF THE INVENTION

Hearing aids (sometimes also referred to as hearing instruments or hearing prostheses) are small devices worn behind the ear or (at least partly) in the ear canal to compensate hearing impairments of hard of hearing persons. Such hearing aids are usually employed for extended periods of time and are powered by small batteries such as a zinc air button cell. Zinc air batteries provide a high energy capacity in a small package size. However, they usually need to be replaced quite often, for instance every few days in the case of a hearing aid being used many hours per day by a hearing impaired person. The handling of such tiny batteries when trying to replace a depleted battery of a small hearing aid with a full one is especially challenging and time consuming for elderly people who have lost their manual dexterity and possess reduced vision, as commonly occurs with ageing. Therefore, rechargeable batteries such as for instance a nickel metal hydride (NiMH) or a lithium ion accumulator are increasingly being utilised in hearing aids. However, rechargeable batteries have a lower capacity than zinc air batteries and consequently can power a hearing aid for a reduced period of time. Hence, it can happen that a hearing aid runs out of power for example when the user is travelling or when he forgot to recharge the battery overnight. These situations are obviously very inconvenient for the user, because he often critically depends on a working hearing aid to improve his hearing capability.

Thus there is a need for appropriate means that help a user to ensure that his hearing aid has sufficient power whenever it is required.

SUMMARY OF THE INVENTION

It is therefore an object of the present invention to provide an improved method for charging a battery of a hearing aid that ensures that the hearing aid has sufficient power whenever the hearing aid is needed by the user. This object is achieved by the method according to claim 1.

Moreover, it is a further goal of the present invention to provide an improved hearing aid capable of supporting the proposed method. This aim is achieved by the hearing aid specified in claim 17.

Specific embodiments of the method and hearing aid according to the present invention are given in the dependent claims.

The present invention provides a method for charging a rechargeable battery of a hearing aid, comprising the steps of:
  detecting a power supply being connected to the hearing aid;
  estimating a state of charge of the battery;
  selecting one of at least a normal and a fast charging mode in dependence of the estimated state of charge; and
  charging the battery according to the selected charging mode.

With the proposed method it is possible to quickly recharge the battery of the hearing aid by using the fast charging mode, for instance when the user wants to leave the house and the charge level of the battery is low. It is important to note that always applying fast charging will gradually degrade the battery capacity, and therefore an abundant use should be avoided and limited to those situations where the user is really in need of being able to continue using his hearing aid for a certain amount of time.

In an embodiment of the method selecting the charging mode depends on one or more predefined criteria stored in a memory of the hearing aid or a hearing aid accessory, such as a remote control unit. In this way it can be ensured that fast charging is limited to certain situations in order to avoid degradation of the battery capacity over time.

In a further embodiment of the method the one or more predefined criteria are stored in the memory of the hearing aid or the hearing aid accessory during fitting of the hearing aid to a hearing capability or preference of a user of the hearing aid. In this way the charging modes available to the user can be customised according to the user's needs.

In a further embodiment of the method selecting the charging mode further depends on a user input, for instance by the user operating a user control element at the hearing aid or at the hearing aid accessory or at the power supply. In this way the user can select the charging mode as needed and can for instance override an automatic selection or restriction imposed by the hearing aid, the hearing aid accessory or the power supply.

In a further embodiment of the method selecting the charging mode further comprises providing information to the user regarding the battery state of charge and presenting one or more possible selections to the user dependent on the battery state of charge. In this way the user may be informed which charging mode is most appropriate in the current situation, e.g. so that the user can be made aware of possible consequences of his selection of a certain charging mode.

In a further embodiment of the method selecting the charging mode is performed automatically by the hearing aid. In this way the user can be relieved of having to make a choice and the hearing aid can employ the most appropriate charging mode, for instance based on the current situation, e.g. based on the present battery charge and/or the current use of the hearing aid, such as its operational state.

In a further embodiment of the method selecting the fast charging mode is only possible when the estimated state of charge is below a first predefined threshold level of the state of charge comprised in the one or more predefined criteria, said first predefined threshold level in particular being in the range from 5% to 50% of the (maximum) battery capacity. In this way fast charging can be disallowed when the charge level of the battery is still quite high.

In a further embodiment of the method selecting the fast charging mode is not possible when the estimated state of charge is below a second predefined threshold level of the state of charge comprised in the one or more predefined criteria, said second predefined threshold level being indicative of a deep discharge of the battery, in particular being in the range from 0% to 5% of the (maximum) battery capacity. In this way fast charging can be prevented when the battery is deeply discharged, because fast charging in such cases could damage the battery.

In a further embodiment of the method charging the battery comprises a constant current charging phase, during which the charging current is kept constant, and a constant voltage charging phase, during which the charging voltage is kept constant, and wherein for charging in the fast charging mode a higher charging current is employed during the constant current phase than for charging in the normal charging mode, and wherein charging is switched from constant current charging to constant voltage charging when the battery voltage exceeds a predefined threshold level comprised in the one or more predefined criteria.

In a further embodiment of the method the duration of the constant current charging phase for charging in the fast charging mode with the higher current is limited to a maximum time interval comprised in the one or more predefined criteria, the maximum time interval in particular being in the range from 1 to 5 minutes, after which the charging switches to another charging mode, in particular to the normal charging mode. In this way excessive fast charging can be prevented in order to maintain the longevity of the battery capacity.

In a further embodiment of the method the predefined threshold level of the battery voltage determining the switching from constant current charging to constant voltage charging is different for the fast charging mode and normal charging mode, the two associated predefined threshold levels being comprised in the one or more predefined criteria, said predefined threshold level of the battery voltage in particular being higher for the fast charging mode than for the normal charging mode.

In a further embodiment of the method fast charging is terminated upon determining that the present state of charge of the battery exceeds a third predefined threshold level of the state of charge comprised in the one or more predefined criteria, the battery capacity associated with the third predefined threshold level of the state of charge in particular being sufficient to power the hearing aid for a time period within the range from 1 to 2 hours. In this way a certain operation time of the hearing aid is guaranteed whilst excessive fast charging is avoided in order to maintain the longevity of the battery capacity.

In a further embodiment the method further comprises, logging information regarding at least one of the following:
  state of charge when charging the hearing aid begins;
  duration of a charging cycle;
  total number of fast charging cycles or mode selections;
  total number of normal charging cycles or mode selections;
  total number of charging cycles;
  total number of user initiated fast charging cycles.

This logged information can be useful to determine the remaining lifetime of a battery and for instance provide information to the user, a fitter or other service provider when the battery needs to be replaced. Moreover, the charging of the battery can be adapted based on such logged information.

In a further embodiment of the method selecting the fast charging mode is not possible when the total number of performed fast charging cycles or mode selections exceeds a predefined maximum number of fast charging cycles comprised in the one or more predefined criteria, said maximum number of fast charging cycles in particular being in the range from 500 to 5000. In this way excessive use of fast charging can be prevented in order to protect the battery.

In a further embodiment of the method selecting the charging mode further comprises providing information to the user regarding a remaining number of allowed fast charging cycles, in particular a difference between a predefined maximum number of fast charging cycles and a total number of previously performed fast charging cycles or mode selections. In this way the user is always aware of how often fast charging has been employed and can be made aware of its excessive use.

In a further embodiment of the method the rechargeable battery is a lithium ion battery, for which the proposed method is especially beneficial.

In a further embodiment of the method estimating the state of charge comprises measuring a voltage level of the battery and/or is based on data logged by the hearing aid pertaining to measurements of the battery current and/or capacity. In this way the state of charge of the battery can be accurately and reliably determined.

Moreover, the present invention provides a hearing aid comprising:
  a microphone;
  a loudspeaker;
  a processing unit adapted to process an input audio signal picked up by the microphone and to provide a processed audio signal to be output by the loudspeaker;
  a rechargeable battery for powering the hearing aid;
  a charge level detector adapted to determine a state of charge of the battery;
  a connection unit adapted to operatively connect a power supply, such as a current source or a voltage source, to the hearing aid; and
  a charging unit adapted to charge the battery from the power supply according to at least one of a normal charging mode and a fast charging mode.

By incorporating the charging unit into the hearing aid a simpler power supply can be employed whilst the specific "intelligence" required for charging a hearing aid is provided in the hearing aid itself. Furthermore, the hearing aid for instance has information regarding its (current, previous and predicted future) use based upon which the charging scheme controlled by the charging unit (e.g. in conjunction with the processing unit) can be optimised.

In an embodiment of the hearing aid the charging unit is controlled by the processing unit. In this way optimisation of the charging process can be further improved.

The charging unit and the processing unit are especially adapted and configured to support charging of a hearing aid according to the method of the present invention.

In a further embodiment of the hearing aid the charging unit or the processing unit is adapted to automatically select the charging mode dependent on one or more predefined criteria stored in a memory of the hearing aid or a hearing aid accessory, such as a remote control unit, operationally connectable with the hearing aid.

In a further embodiment the hearing aid further comprises or is operationally connectable with a user control element operable by a user of the hearing aid to select the charging mode, the user control element in particular being arranged at a hearing aid accessory, such as a remote control unit, or at the power supply.

In a further embodiment the hearing aid further comprises or is operationally connectable with a display unit adapted to provide information to the user regarding the battery state of charge and to present one or more possible selections to the user dependent on the battery state of charge, and/or to provide information to the user regarding a remaining number of allowed fast charging cycles, in particular a difference between a predefined maximum number of fast charging cycles and a total number of previously performed fast charging cycles or mode selections, the display unit in particular being arranged at a hearing aid accessory, such as a remote control unit.

In a further embodiment of the hearing aid the rechargeable battery is a lithium ion battery.

In a further embodiment of the hearing aid the connection unit comprises electrical contacts.

In a further embodiment of the hearing aid the connection unit comprises an induction coil to wirelessly connect the power supply with the hearing aid.

In a further embodiment of the hearing aid the connection unit comprises a capacitive coupling means to wirelessly connect the power supply with the hearing aid.

In a further embodiment of the hearing aid the connection unit comprises an optical coupling means, in particular the hearing aid comprises a photovoltaic element.

It is to be noted that combinations of the individual embodiments mentioned above may result in even further embodiments of the present invention unless the combined features stand in contradiction.

BRIEF DESCRIPTION OF THE DRAWING

The present invention is further explained below by means of non-limiting specific embodiments and with reference to the accompanying drawing, which shows:

FIG. 1 depicts a schematic block diagram of a hearing aid according to the present invention.

DETAILED DESCRIPTION OF THE INVENTION

A hearing aid 1 according to the present invention is illustrated schematically in FIG. 1. It comprises a microphone 2 for picking up sound from the surroundings of a user wearing the hearing aid 1 at an ear or at least partly within an ear canal, a processing unit 4 for processing, e.g. amplifying, the audio signal from the microphone 2, and a miniature loudspeaker 3 (often also referred to as a receiver) for outputting the processed audio signal into the ear canal of the user. The hearing aid 1 is powered by a rechargeable battery 5 such as for instance a lithium ion button cell. Because the hearing aid 1 is typically used for a prolonged period of time, e.g. throughout the day, the battery needs to be recharged overnight. Extensive use of the hearing aid 1, e.g. when a high degree of amplification or a large amount of processing is required, for instance due to frequent changes of listening environments or due to the use of power-intensive features such as beamforming, feedback cancelling or audio streaming, the battery may deplete more rapidly so that the hearing aid 1 needs to be recharged during the course of the day. A charge level detector 6 monitors the state of charge of the battery 5 and the user is informed, e.g. via a signal output by the loudspeaker 3, when the battery 5 is running short of power. If the user urgently needs the hearing aid 1 to remain operational, he would find it useful to be able to quickly charge the battery 5, at least to a level which allows to power the hearing aid 1 for 1 to 2 hours. The user can initiate fast charging of the battery 5 by connecting the hearing aid 1 to a power supply 8 and for instance pressing a fast charging button 12 on a user control device 11 such as a remote control unit. The button 12 could also be located on the hearing aid 1 itself or be arranged at the power supply 8. The power supply 8 may be connected via wires and electrical contacts with the hearing aid 1 or power may be wirelessly conveyed to the hearing aid 1, e.g. by means of capacitive or inductive coupling.

The charging process is controlled by a charging unit 9, possibly in conjunction with the processing unit 4, taking into account the estimated state of charge of the battery 5 provided by the charge level detector 6. The charging unit 9 and/or the processing unit 4 may automatically select a charging mode dependent on one or more predefined criteria stored in a memory 10 of the hearing aid 1. Such data may alternatively be stored in a memory of a hearing aid accessory 11, such as a remote control unit, which can be operationally connected with the hearing aid 1, e.g. wirelessly.

Information regarding the current state of charge along with possible charging options may be provided to the user on a display, e.g. located on the hearing aid accessory 11, so that the user can select an appropriate charging mode. In this way it is possible to provide guidance to the user in respect of how many fast charging cycles can still be applied to the battery 5 without damaging at. Furthermore, the user can for instance be informed that fast charging is not available, e.g. because the power level of the battery 5 is sufficiently high to allow prolonged use of the hearing aid 1, or because the battery 5 in deeply discharged so that the battery 5 would be damaged by fast charging.

In order to provide such information to the user, it is useful to log data regarding charging of the battery 5 in the hearing aid memory 10 or alternatively in a memory of an accessory 11 such as a remote control unit. This logged data can also be useful to determine the remaining lifetime of the battery 5 and for instance provide information to the user, a fitter or other service provider when the battery 5 needs to be replaced. Moreover, the charging of the battery 5 can be adapted based on the logged data.

Since the increased constant current employed during fast charging can significantly degrade the capacity of the battery 5, the present invention ensures that fast charging is only active for a short period of time (e.g. by limiting the time period of the constant current phase (with increased charging current) of the charging cycle). Moreover, fast charging is optimised to guarantee a charge level allowing to operate the hearing aid 1 for one to two hours.

The present invention provides an improved hearing aid 1 which allows to manage the charging in a more user friendly manner. The proposed method for fast charging provides a better compromise between battery lifetime and momentary user needs. A further advantage of the present invention is the simplification of the overall hearing system, because the charging is controlled by the hearing aid 1 itself. This results in lower cost and greater efficiency because the charging unit 9 controlling the charging process (possibly as part of or in conjunction with the processing unit 4) is integrated into the hearing aid 1, so that a simpler more generic (but "dumber") power supply 8 can be employed.

The invention claimed is:
1. A method for charging a rechargeable lithium-ion battery of a hearing device, the method comprising:
  detecting a power supply connected to a hearing device;
  estimating a state of charge of a rechargeable lithium-ion battery;
  determining that the estimated state of charge is below a first threshold and above a second threshold,
    wherein the first threshold is associated with less than or equal to 50% capacity of the rechargeable lithium-ion battery,
    wherein the second threshold is associated with greater than or equal to 5% of the capacity of the rechargeable lithium-ion battery;
  selecting a fast charging mode based on determining the estimated state of charge is below the first threshold and above the second threshold, wherein the fast charging mode is associated with charging the rechargeable lithium-ion battery with a constant current that is a higher charging current compared to charging current in the normal charging mode; and
charging the rechargeable lithium-ion battery according to the fast charging mode.

2. The method of claim 1, wherein selecting the charging mode depends on predefined criteria stored in a memory of the hearing device or a hearing device accessory.

3. The method of claim 2, wherein the predefined criteria are stored in the memory during fitting of the hearing device or based on a user preference received during the fitting session.

4. The method of claim 1, wherein selecting the charging mode further is based on a user input, wherein the user input comprises at least one of the following: toggling a user control element at the hearing device, at the hearing device accessory, at the power supply, or a combination thereof.

5. The method of claim 1, wherein selecting the charging mode further comprises:
providing information to the user regarding the rechargeable lithium-ion battery state of charge and presenting selection options for charging the rechargeable lithium-ion battery based on the rechargeable lithium-ion battery state of charge.

6. The method of claim 1, wherein selecting the charging mode is performed automatically by the hearing device.

7. The method of claim 2,
wherein the charging voltage is kept constant during the charging phase.

8. The method of claim 5, wherein the duration of the constant current charging phase for charging in the fast charging mode with the higher current is limited to a maximum time interval.

9. The method of claim 5, wherein the predefined threshold level of the rechargeable lithium-ion battery voltage determining the switching from constant current charging to constant voltage charging is different for the fast charging mode and normal charging mode, the two associated predefined threshold levels being comprised in the one or morepredefined criteria.

10. A non-transitory computer-readable medium storing instructions that when executed by a processor cause a device to perform operations, the operations comprising:
detecting a power supply being connected to a hearing device;
estimating a state of charge of a rechargeable lithium-ion battery of the hearing device;
determining that the estimated state of charge is below a first threshold and above a second threshold associated with a fast charging mode,
wherein the first threshold is associated with less than or equal to 50% capacity of the rechargeable lithium-ion battery,
wherein the second threshold is associated with greater than or equal to 5% of the capacity of the rechargeable lithium-ion battery,
wherein the fast charging mode is associated with charging the rechargeable lithium-ion battery with a constant current that is a higher charging current compared to a charging current in the normal charging mode;
selecting the fast charging mode based on the state of charge; and
charging the rechargeable lithium-ion battery according to the selected charging mode.

11. The non-transitory computer-readable medium of claim 10, wherein fast charging is terminated upon determining that the present state of charge of the rechargeable lithium-ion battery exceeds a third predefined threshold level of the state of charge comprised in the one or more predefined criteria, the rechargeable lithium-ion battery capacity associated with the third predefined threshold level of the state of charge in particular being sufficient to power the hearing device for a time period within the range from 1 to 2 hours.

12. The non-transitory computer-readable medium of claim 10, further comprising,
logging information regarding at least one of the following: state of charge when charging the hearing aid begins; duration of a charging cycle; total number of fast charging cycles or mode selections; total number of normal charging cycles or mode selections;
total number of charging cycles; and
total number of user initiated fast charging cycles.

13. The non-transitory computer-readable medium of claim 10, wherein selecting the fast charging mode is not possible when the total number of fast charging cycles or mode selections exceeds a predefined maximum number of fast charging cycles.

14. The non-transitory computer-readable medium of claim 10, wherein selecting the charging mode further comprises providing information to the user regarding a remaining number of allowed fast charging cycles, wherein the number of allowed fast charging cycles is based on at least one of the following: a predefined maximum number of fast charging cycles, a total number of previously performed fast charging cycles or mode, average life time of the rechargeable lithium-ion battery, or preferences set by the rechargeable lithium-ion battery manufacturer.

15. A hearing device comprising:
a microphone;
a loudspeaker;
a processing unit configured to process an audio signal received by the microphone and configured to provide a processed audio signal to the loudspeaker;
a rechargeable lithium-ion battery for powering the hearing device;
a charge level detector adapted to determine a state of charge of the rechargeable lithium-ion battery;
a connection unit adapted to operatively connect a power supply to the hearing device;
a charging unit adapted to charge the rechargeable lithium-ion battery from the power supply based on a normal charging mode or a fast charging mode; and
a memory storing instructions that when executed by the processing unit cause the hearing device to perform operations, the operations comprising:
determine that a state of charge of the rechargeable lithium-ion battery is below a first threshold and above a second threshold,
wherein the first threshold is associated with less than or equal to 50% capacity of the rechargeable lithium-ion battery,
wherein the second threshold is associated with greater than or equal to 5% of the capacity of the rechargeable lithium-ion battery,
wherein the fast charging mode is associated with charging the rechargeable lithium-ion battery with a constant current that is a higher charging current compared to a normal charging mode; and
control the charging unit such that a fast charging mode is implemented if the determined state of charge of the rechargeable lithium-ion battery is below the first threshold and above the second threshold.

16. The hearing device of claim 15, wherein the charging unit is controlled by the processing unit and further comprising:
a transmitter configured to communicate with a device to receive a user selection for a charging mode.

17. The hearing device of claim 15, wherein the charging unit or the processing unit is adapted to automatically select the charging mode dependent on predefined criteria stored in a memory of the hearing device or a hearing device accessory.

18. The hearing device of claim 15, further comprising a user control element to select the charging mode.

19. The hearing device of claim 15, where the instructions further include operations comprising:
disable the fast charging mode after 500 charging cycles for the rechargeable lithium-ion battery.

20. The hearing device of claim 19, where the instructions further include operations comprising:
notify a user that the fast charging mode has been disabled.

* * * * *